(12) United States Patent
Lee et al.

(10) Patent No.: US 10,531,410 B2
(45) Date of Patent: Jan. 7, 2020

(54) UNIFIED SYNCHRONIZATION CHANNEL DESIGN USED IN DIFFERENT COMMUNICATION MODES

(71) Applicant: QUALCOMM Incorporated, San Diego, CA (US)

(72) Inventors: Heechoon Lee, San Diego, CA (US); Hung Ly, San Diego, CA (US); Tingfang Ji, San Diego, CA (US); Haitong Sun, Cupertino, CA (US); Wanshi Chen, San Diego, CA (US); Peter Gaal, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 15/806,210

(22) Filed: Nov. 7, 2017

(65) Prior Publication Data

US 2018/0139713 A1    May 17, 2018

Related U.S. Application Data

(60) Provisional application No. 62/419,409, filed on Nov. 8, 2016, provisional application No. 62/419,398, filed on Nov. 8, 2016.

(51) Int. Cl.
*H04W 56/00* (2009.01)
(52) U.S. Cl.
CPC .............................. *H04W 56/0005* (2013.01)
(58) Field of Classification Search
None
See application file for complete search history.

(56) References Cited

U.S. PATENT DOCUMENTS

2014/0334478 A1   11/2014  Cheng et al.
2016/0295620 A1*  10/2016  Lindoff ................. H04W 76/14

FOREIGN PATENT DOCUMENTS

WO    WO-2018031644 A1 *  2/2018  .............. H04J 11/00

OTHER PUBLICATIONS

Coolpad: "Discussion on the Design for Synchronization Signal", 3GPP Draft; R1-1612755, 3rd Generation Partnership Project (3GPP), Mobile Competence Centre; 650, Route Des Lucioles; F-06921 Sophia-Anti Polls Cedex; France, vol. RAN WG1, No. Reno, USA; Nov. 4, 2016, XP051189452, Retrieved from the Internet: URL:http://www.3gpp.org/ftp/tsg_ran/WG1_RL1/TSGR1_87/Docs/ [retrieved on Nov. 4, 2016], 3 pages.

(Continued)

*Primary Examiner* — Robert M Morlan
(74) *Attorney, Agent, or Firm* — Norton Rose Fulbright LLP

(57) ABSTRACT

Split synchronization signal configuration for unified synchronization channels and techniques for indicating communication block boundaries in wireless communication systems that use a unified synchronization signal configuration that may be used in different communication modes are described. The disclosed split synchronization signal configuration allows the same synchronization signal configuration to be used in different communication modes (or numerologies) that operate on different frequencies. The boundary indication techniques of embodiments allow efficient indication of the beginning of a communication block (such as a frame, subframe, or slot) relative to the beginning of a unified synchronization signal configuration.

43 Claims, 7 Drawing Sheets

(56) References Cited

OTHER PUBLICATIONS

International Search Report and Written Opinion—PCT/US2017/060653—ISA/EPO—Jan. 31, 2018.

Potevio: "Discussion on the Numerology During Initial Access Procedure", 3GPP Draft; R1-1612650, 3rd Generation Partnership Project (3GPP), Mobile Competence Centre; 650, Route Des Lucioles; F-06921 Sophia-Anti Polls Cedex; France, vol. RAN WG1, Reno, USA; Nov. 4, 2016, XP051189432, Retrieved from the Internet: URL:http://www.3gpp.org/ftp/tsgran/WG1_RL1/TSGR1_87/Docs/ [retrieved on Nov. 4, 2016], 3 pages.

ZTE: "Unified Synchronization Structure", 3GPP Draft; R1-166422, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051125366, Retrieved from the Internet: URL:http://www.3gpp.org/ftp/Meetings_3GPP_SYNC/RAN1/Docs/ [retrieved on Aug. 21, 2016], 4 pages.

* cited by examiner

UNIFIED SYNCHRONIZATION CHANNEL DESIGN USED IN DIFFERENT COMMUNICATION MODES

CROSS-REFERENCE TO RELATED APPLICATIONS

This application claims the benefit of U.S. Provisional Patent Application No. 62/419,409, entitled, "BOUNDARY INDICATION IN UNIFIED SYNCHRONIZATION CHANNEL DESIGN," filed on Nov. 8, 2016, and U.S. Provisional Patent Application No. 62/419,398, entitled "SPLIT SYNCHRONIZATION SIGNAL CONFIGURATION FOR UNIFIED SYNCHRONIZATION USED IN DIFFERENT COMMUNICATION MODES," filed Nov. 8, 2016, the disclosures of which are hereby incorporated by reference herein in their entirety as if fully set forth below and for all applicable purposes.

TECHNICAL FIELD

Aspects of the present disclosure relate generally to wireless communication systems, and more particularly, to synchronization signal design for unified synchronization channels and indication of communication block boundary in a wireless communication system. Certain embodiments of the technology discussed below allows the same synchronization signal design to be used in different communication modes (or numerologies) and can provide efficient signal detection and processing in a wireless communication system.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is disclosed.

For example, the method can include determining an arrangement of multiple synchronization signals for wireless communication between two or more nodes, wherein the arrangement of multiple synchronization signals is configured for multiple communication modes. The method can further include indicating, via at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, an apparatus configured for wireless communication is provided. The apparatus includes at least one processor, and a memory coupled to the processor. For example, the at least one processor can be configured to determine an arrangement of multiple synchronization signals for wireless communication between two or more nodes, wherein the arrangement of multiple synchronization signals is configured for multiple communication modes. The at least one processor can further be configured to indicate, via at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, a system configured for wireless communication is provided. For example, the system can include means for determining an arrangement of multiple synchronization signals for wireless communication between two or more nodes, wherein the arrangement of multiple synchronization signals is configured for multiple communication modes. The system can further include means for indicating, via at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, a non-transitory computer-readable medium having program code recorded thereon is provided. The program code can include code for causing one or more computers to determine an arrangement of multiple synchronization signals for wireless communication between two or more nodes, wherein the arrangement of multiple synchronization signals is configured for multiple communication modes. The program code can further include code for causing the one or more computers to indicate, via at least one synchronization signal of the arrangement of multiple synchronization signals, a distance between a beginning of the arrangement of multiple synchronization signals and a beginning of a communication block containing the arrangement of multiple synchronization signals.

In one aspect of the disclosure, a method of wireless communication is provided. For example, a method can include detecting an arrangement of multiple synchronization signals in a wireless communication between two or more nodes, wherein the arrangement of multiple synchronization signals is configured for multiple communication modes. The method can further include determining, using boundary information carried by at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, an apparatus configured for wireless communication is provided. The apparatus includes at least one processor, and a memory coupled to the processor. For example, the at least one processor can be configured to detect an arrangement of multiple synchronization signals in a wireless communication between two or more nodes, wherein the arrangement of multiple synchronization signals is configured for multiple communication modes. The at least one processor can further be configured to determine, using boundary information carried by at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, system configured for wireless communication is provided. For example, the system can include means for detecting an arrangement of multiple synchronization signals in a wireless communication between two or more nodes, wherein the arrangement of multiple synchronization signals is configured for multiple communication modes. The system can further include means for determining, using boundary information carried by at least one synchronization signal of the arrangement of multiple synchronization signals, a distance between a beginning of the arrangement of multiple synchronization signals and a beginning of a communication block containing the arrangement of multiple synchronization signals.

In an additional aspect of the disclosure, a non-transitory computer-readable medium having program code recorded thereon is provided. The program code can include code for causing one or more computers to detect an arrangement of multiple synchronization signals in a wireless communication between two or more nodes, wherein the arrangement of multiple synchronization signals is configured for multiple communication modes. The program code can further include code for causing the one or more computers to determine, using boundary information carried by at least one synchronization signal of the arrangement of multiple synchronization signals, a distance between a beginning of the arrangement of multiple synchronization signals and a beginning of a communication block containing the arrangement of multiple synchronization signals.

In one aspect of the disclosure, a method for wireless communication is provided. For example, a method can include determining an arrangement of multiple synchronization signals for wireless communication between two or more nodes. The method can further include determining at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology.

In an additional aspect of the disclosure, an apparatus configured for wireless communication is provided The apparatus includes at least one processor, and a memory coupled to the processor. For example, the at least one processor can be configured to determine an arrangement of multiple synchronization signals for wireless communication between two or more nodes. The at least one processor can further be configured to determine at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology.

In an additional aspect of the disclosure, a system configured for wireless communication is provided. For example, the system can include means for determining an arrangement of multiple synchronization signals for wireless communication between two or more nodes. The system can further include means for determining at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology.

In an additional aspect of the disclosure, a non-transitory computer-readable medium having program code recorded thereon is provided. The program code can include code for causing one or more computers to determine an arrangement of multiple synchronization signals for wireless communication between two or more nodes. The program code can further include code for causing the one or more computers to determine at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
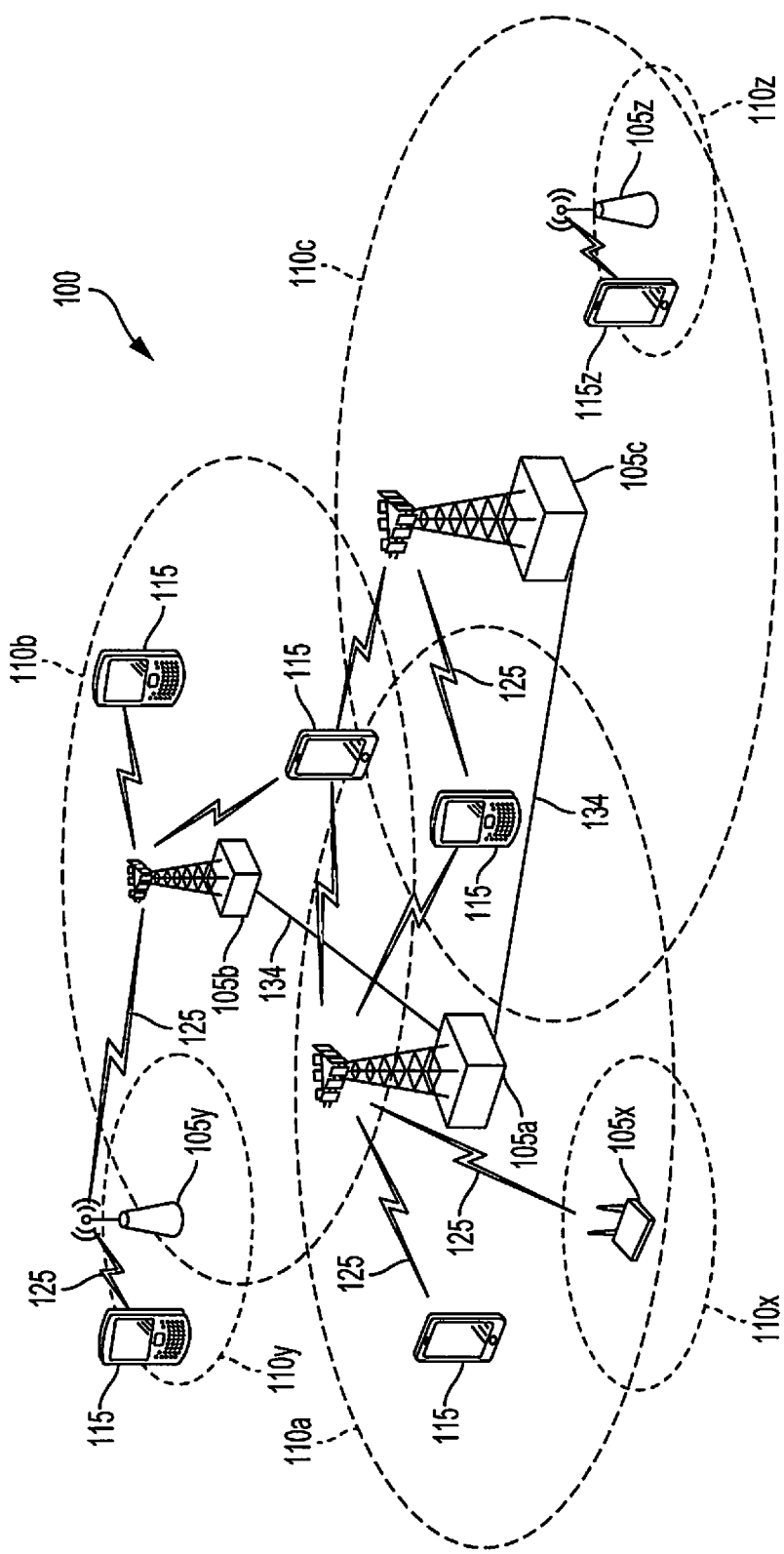
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless nodes (e.g., base stations, user devices, access points, terminal devices, etc.) in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, long term evolution (LTE) networks, Global System for Mobile Communications (GSM) networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, LTE is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., node to node or peer to peer or ad hoc network arrangements, etc.).

Turning back to FIG. 1 wireless network 100 includes a number of base stations, such as may comprise evolved node Bs (eNBs) or G node Bs (gNBs). These may be referred to as gNBs 105. A gNB may be a station that communicates with the UEs and may also be referred to as a base station, a node B, an access point, and the like. Each gNB 105 may provide communication coverage for a particular geographic area. In 3GPP, the term "cell" can refer to this particular geographic coverage area of a gNB and/or a gNB subsystem serving the coverage area, depending on the context in which the term is used. In implementations of wireless network 100 herein, gNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

A gNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A gNB for a macro cell may be referred to as a macro gNB. A gNB for a small cell may be referred to as a small cell gNB, a pico gNB, a femto gNB or a home gNB. In the example shown in FIG. 1, gNBs 105a, 105b and 105c are macro gNBs for the macro cells 110a, 110b and 110c, respectively. gNBs 105x, 105y, and 105z are small cell gNBs, which may include pico or femto gNBs that provide service to small cells 110x, 110y, and 110z, respectively. A gNB may support one or multiple (e.g., two, three, four, and the like) cells.

Wireless network 100 may support synchronous or asynchronous operation. For synchronous operation, the gNBs may have similar frame timing, and transmissions from different gNBs may be approximately aligned in time. For asynchronous operation, the gNBs may have different frame timing, and transmissions from different gNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copier, a quad-copier, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc., and digital home or smart home devices such as a home audio, video, and multimedia device, an, appliance, a sensor, a vending machine, intelligent lighting, a home security system, a smart meter, etc. A mobile apparatus, such as UEs 115, may be able to communicate with macro gNBs, pico gNBs, femto gNBs, relays, and the like. In FIG. 1, a lightning bolt (e.g., communication links 125) indicates wireless transmissions between a UE and a serving gNB, which is a gNB designated to serve the UE on the downlink and/or uplink, or desired transmission between gNBs. Although backhaul communication 134 is illustrated as wired backhaul communications that may occur between gNBs, it should be appreciated that backhaul communications may additionally or alternatively be provided by wireless communications.

Figure 2:
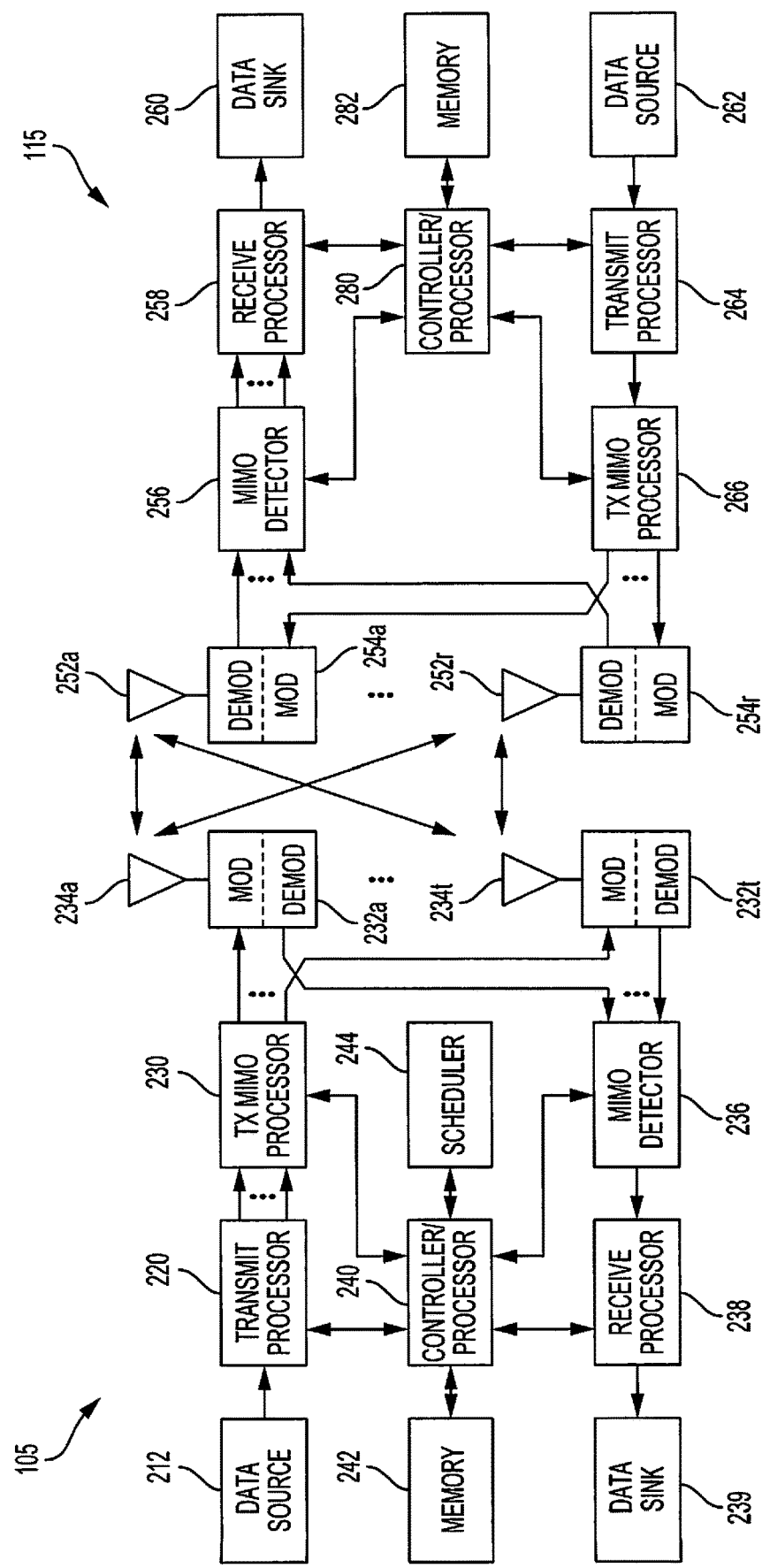
FIG. 2 is a block diagram conceptually illustrating a design of a base station/gNB and a UE configured according to some embodiments of the present disclosure.

FIG. 2 shows a block diagram of a design of base station/gNB 105 and UE 115. These can be one of the base stations/gNBs and one of the UEs in FIG. 1. For a restricted association scenario (as mentioned above), the gNB 105 may be small cell gNB 105z in FIG. 1, and LTE 115 may be UE 115z, which in order to access small cell gNB 105z, would be included in a list of accessible UEs for small cell gNB 105z. gNB 105 may also be a base station of some other type. gNB 105 may be equipped with antennas 234a through 234t, and UE 115 may be equipped with antennas 252a through 252r.

At gNB 105, transmit processor 220 may receive data from data source 212 and control information from controller/processor 240. The control information may be for the physical broadcast channel (PBCH), physical downlink control channel (PDCCH), etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS). Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from gNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to gNB 105. At gNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at gNB 105 and UE 115, respectively. Controller/processor 240 and/or other processors and modules at gNB 105 and/or controllers/processor 280 and/or other processors and modules at UE 115 may perform or direct the execution of various processes for the techniques described herein, such as to perform or direct the execution illustrated in FIGS. 4, 6, and 7, and/or other processes for the techniques described herein. Memories 242 and 282 may store data and program codes for gNB 105 and UE 115, respectively. Scheduler 244 may schedule UEs for data transmission on the downlink and/or uplink.

In facilitating increased capacity, tolerance to interference, robust performance, etc., wireless networks may support a plurality of communication modes for the communications by and between various network nodes. For example, wireless network 100 may support a plurality of different communication modes, which may utilize one or more different parameters (such as subcarrier spacing, frequency, frame structure, symbol length, OFDM symbol times, sample rates, etc.). A particular communication mode may be selected for use in a communication link between a gNB and UE depending upon various aspects of the situation (e.g., channel condition, received signal strength, interference environment, etc.). The different parameters utilized with respect to the communication modes are referred to herein as numerologies. As one example of a different numerology as may be implemented according to embodiments of the present disclosure, wireless network 100 operable in accordance with 5G protocols currently under development may support communication modes having different subcarrier spacing (e.g., 15 kHz, 30 kHz, 60 kHz, etc., subcarrier spacing).

Although the communication modes may differ according to the foregoing numerologies, embodiments operable in accordance with the concepts herein may nevertheless utilize a same synchronization signal configuration (referred to herein as a unified synchronization signal configuration) with respect to two or more (e.g., all) of the different communication modes. For example, in order to facilitate network nodes (e.g., UEs) being able to detect a synchronization signal transmitted according to any of a plurality of communication modes (e.g., signals having any of the aforementioned 15 kHz, 30 kHz, or 60 kHz, subcarrier spacing) without first knowing the particular communication mode, embodiments of the present disclosure provide a unified synchronization signal configuration that may be borne by signals of each such communication mode. However, because of the differences in the signals of the different communication modes (e.g., subcarrier spacing, symbol size, data payload, etc.) a unified synchronization signal configuration according to embodiments herein includes a split configuration, wherein a predetermined gap is provided within the synchronization signal suite adapted to facilitate the use of the same synchronization signal configuration in signals of multiple communication modes. For example, a synchronization signal suite of embodiments may comprise a plurality of signals, such as two or more of: a PSS, SSS, one or more signals transmitted over a PBCH, and/or reference signal (RS) (e.g., which may be used as a measurement RS or a demodulation RS for PBCH signals). The synchronization signal suite may be transmitted in a predetermined arrangement and having a predetermined gap disposed between two or more signals of the synchronization signal suite.

Figure 3:
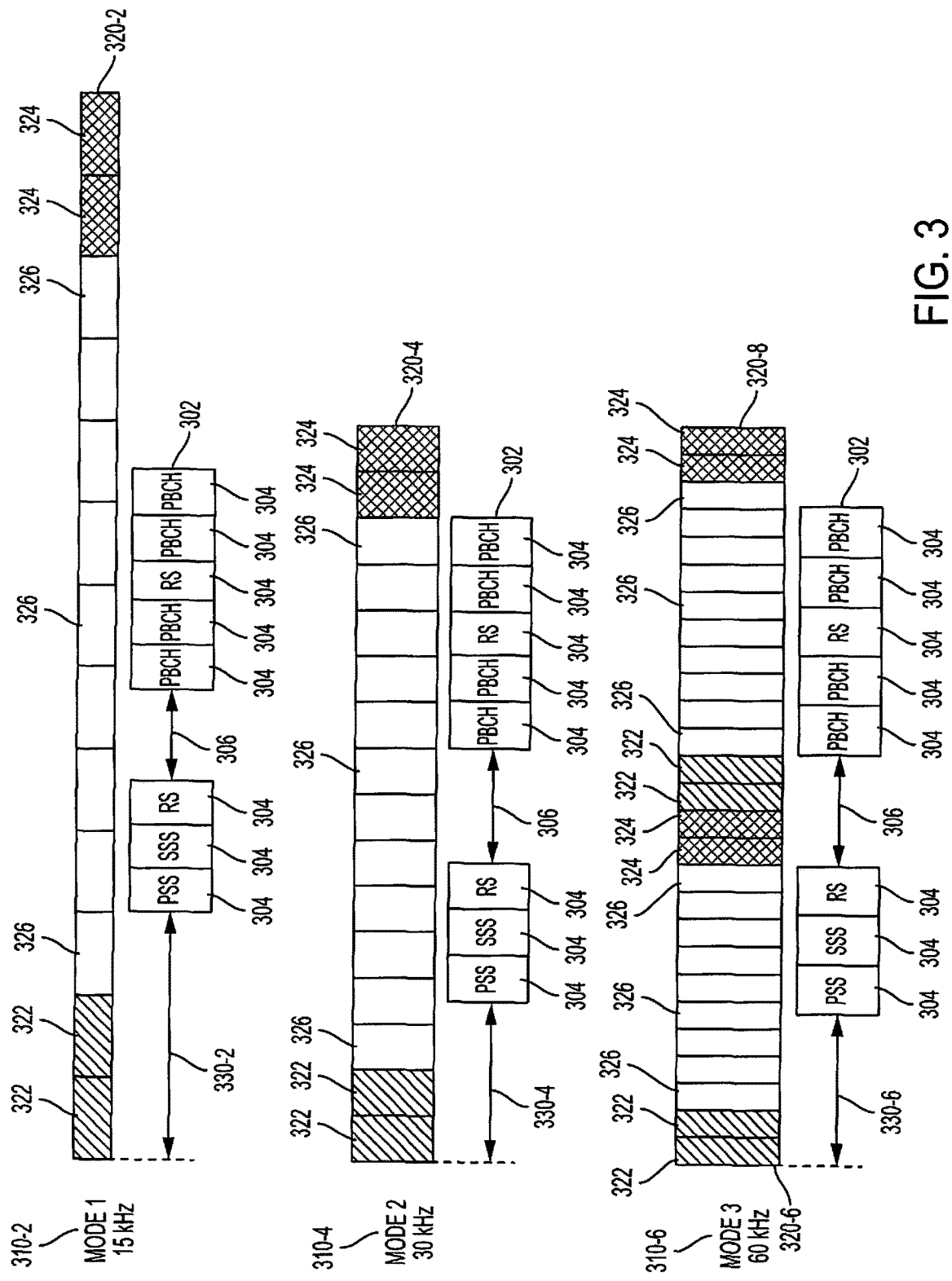
FIG. 3 is a block diagram conceptually illustrating a system for indicating a boundary of a communication block in a unified synchionization channel design according to some embodiments of the present disclosure.

FIG. 3 shows a block diagram for a unified synchronization signal configuration of some embodiments as may be used in wireless network 100. The unified synchronization signal configuration may be used, for example, for communications between gNB 105 and UE 115, between gNBs 105a-c, or between multiple UEs. FIG. 3 shows a unified synchronization signal configuration where the same synchronization signal configuration 302 can be used for different communication modes 310-2, 310-4, and 310-6 in a wireless communication network. In each communication mode of the illustrated embodiment, data communication between two nodes are divided into blocks, e.g., frames (or subframes or slots) 320-2, 320-4, 320-6, and 320-8. Each communication block may include one or more units for control signals (e.g., control symbols 322, 324) and one or more units for data signals (e.g., data symbols 326) located between control signal units. In some embodiments, control signals in communication blocks 320-2, 320-4, 320-6, and 320-8 may include one or more units (e.g., 322) for downlink (from a gNB to a UE) control signals and/or one or more units (e.g., 324) for uplink (from a UE to a gNB) control signals. In some wireless communication systems, a communication block may represent a frame, two consecutive units in the communication block may represent a subframe (e.g., in a time division duplex (TDD) or frequency division duplex (FDD) system), and one unit in the communication block may represent a slot (e.g., in an FDD system). In some embodiments, a communication block may represent a subframe or a slot.

In the illustrated example, each communication mode operates utilizing a different subcarrier spacing, e.g., communication mode 310-2 operates utilizing a 15 kHz subcarrier spacing, communication mode 310-4 operates utilizing a 30 kHz subcarrier spacing, and communication mode 310-6 operates utilizing a 60 kHz subcarrier spacing. Accordingly, the numerology of the communication modes in the illustrated example comprises subcarrier spacing. Consequently, communication blocks 320-2, 320-4, 320-6, and 320-8 for these different communication modes provide different symbol sizes and different spacing. For example, in the illustrated embodiment, synchronization signal 304 occupies half of a unit (e.g., one half of a symbol) in mode 310-2, one unit (e.g., one symbol) in mode 310-4, and two units (e.g., two symbols) in mode 310-6.

In the illustrated embodiment, synchronization signal configuration 302 includes an arrangement of multiple synchronization signals 304 also referred to as a synchronization signal block (SSB), which may include, for example, a PSS, SSS, RS, and signals transmitted over a PBCH. For example, in the illustrated embodiment, the SSB of synchronization signal configuration 302 comprises a suite of synchronization signals including a PSS followed by a SSS and a RS (e.g., a demod RS for PBCH that may also be used for cell measurements, referred to herein as a measurement reference signal or MRS), which is in turn followed by two PBCHs, a RS, and then two PBCH signals. It should be noted that in some other embodiments, the SSB of synchronization signal configuration 302 may comprise a suite of synchronization signals including any other combination of any number of synchronization signals in any suitable order.

In some embodiments, it is desirable that synchronization signals 304 occupy only units assigned for data signals (i.e., any unfilled units, which are generally labeled as 326) in communication blocks 320-2, 320-4, 320-6, and 320-8 and avoid an overlap with units assigned for control signals (units 322 and 324). However, in some consecutive arrangements of synchronization signals, the consecutive block of synchronization signals cannot be filled in data units of a communication block in certain communication modes. For example, in the illustrated example, a consecutive arrangement of synchronization signals 304 cannot all be fit in the data units 326 in communication block 320-6 or all in communication block 320-8. Consequently, to adapt the same synchronization signal configuration 302 for different communication modes, embodiments insert one or more gaps (e.g., gap 306) between synchronization signals 304 of the SSB of synchronization signal configuration 302. As illustrated in FIG. 3, gap 306 may be designed to separate synchronization signals 304 into two groups, such that one group of synchronization signals, fit into data units 326 of communication block 320-6 and another group of synchronization signals fit into data units 326 of communication block 320-8. When the split synchronization signal configuration 302 is used in other communication modes, such as communication modes 320-2 and 320-4, since there is enough space in data units 326, all synchronization signals 304 may be fit into data units of one communication block (e.g., communication blocks 320-2 or 320-4). With such a split synchronization signal configuration 302, the same arrangement of multiple synchronization signals may be used for different communication modes, and none of the synchronization signals from synchronization signal configuration 302 occupies any units reserved for control signals (i.e., units 322, 324) in any communication mode.

It should be noted that, in some embodiments, a plurality of gaps may be utilized to separate the synchronization signals of SSBs into three or more groups, such that the various groups of synchronization signals fit into data units of the different communication modes. For example, there may be more than three communication modes and there may be multiple gaps in synchronization signal configuration 302. Extending this example to a numerology comprising different subcarrier spacing as described above, there may be a fourth communication mode operating to utilize 120 kHz subcarrier spacing, and it may be desirable to have two gaps for synchronization signal configuration 302 so that synchronization signals 304 of the SSB may be split into three groups and fit into data units of three consecutive communication blocks. Further, the synchronization signal configuration 302 may be used in wireless communication systems that use either frequency division duplex. (FDD) or time division duplex (TDD).

Figure 4:
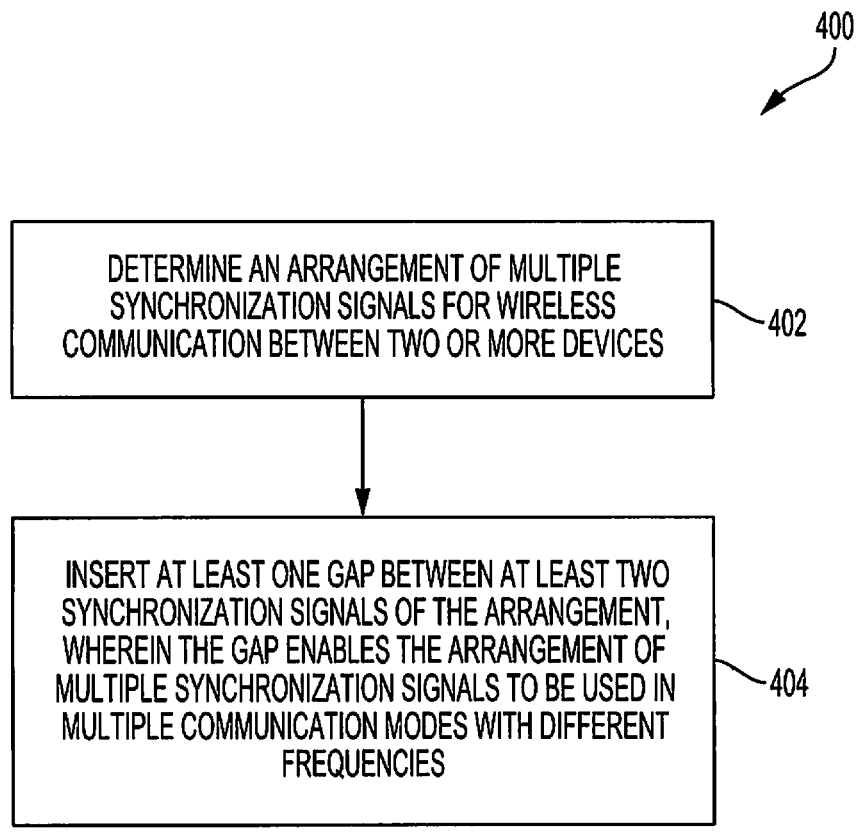
FIG. 4 is a block diagram conceptually illustrating a method for determining a unified synchronization signal configuration for a unified synchronization channel design according to some embodiments of the present disclosure.

FIG. 4 shows a block diagram for a method 400 of determining a unified synchronization signal arrangement according to embodiments of the present disclosure. In the illustrated embodiment, at block 402 unified synchronization signal logic (e.g., an instruction set stored by memory 242 and executable upon controller/processor 240 of gNB 105) of a network node determines an arrangement of multiple synchronization signals for wireless communication between two or more nodes. The nodes may include a gNB, a UE, or other nodes in wireless communication network 100 as described above in connection with FIG. 1. The synchronization signals may, for example, include one or more of the following signals: PSS, SSS, RS, and REICH signals. At block 404, unified synchronization signal logic may cause one or more gaps to be inserted between two or more synchronization signals of the arrangement (e.g., an instruction set stored by memory 242 and executable upon controller/processor 240 of gNB 105 may control transmit processor 220 in insert one or more gaps between two or more synchronization signals to be transmitted by gNB 105). The one or more gaps may enable the same arrangement of multiple synchronization signals to be used in multiple communication modes that operate utilizing different numerologies, such as communication modes 320-2, 310-4, 310-6 described above in connection with FIG. 3. The one or more gaps among synchronization signals of the arrangement of multiple synchronization signals may allow the multiple synchronization signals to be fit in data units of one or more communication blocks (such as communication blocks 320-2, 320-4, 320-6, 320-8 described in FIG. 3) and avoid any overlap with units reserved for other control signals in the one or more communication blocks.

The aforementioned different numerologies utilized by the communication modes may result in differences in the various blocks (e.g., frames) transmitted. For example, different numerologies corresponding to subcarrier spacing may provide for differences in symbol lengths as between the signals transmitted by the communication modes. Accordingly, although a unified synchronization signal, such as that shown in the exemplary embodiment illustrated in FIG. 3, may be utilized for each of a plurality of communication modes, the unified synchronization signal may nevertheless have differences as disposed in the blocks of each such communication mode. For example, a unified synchronization signal, although having a same predetermined arrangement of synchronization signals transmitted using each communication mode, may be disposed having a different boundary offset in the different communication modes. Accordingly, a unified synchronization signal configuration of embodiments, as may facilitate detection of the synchronization signals by a network node (e.g., UE), may be adapted to facilitate detection of a communication block of the communication modes.

Figure 5:
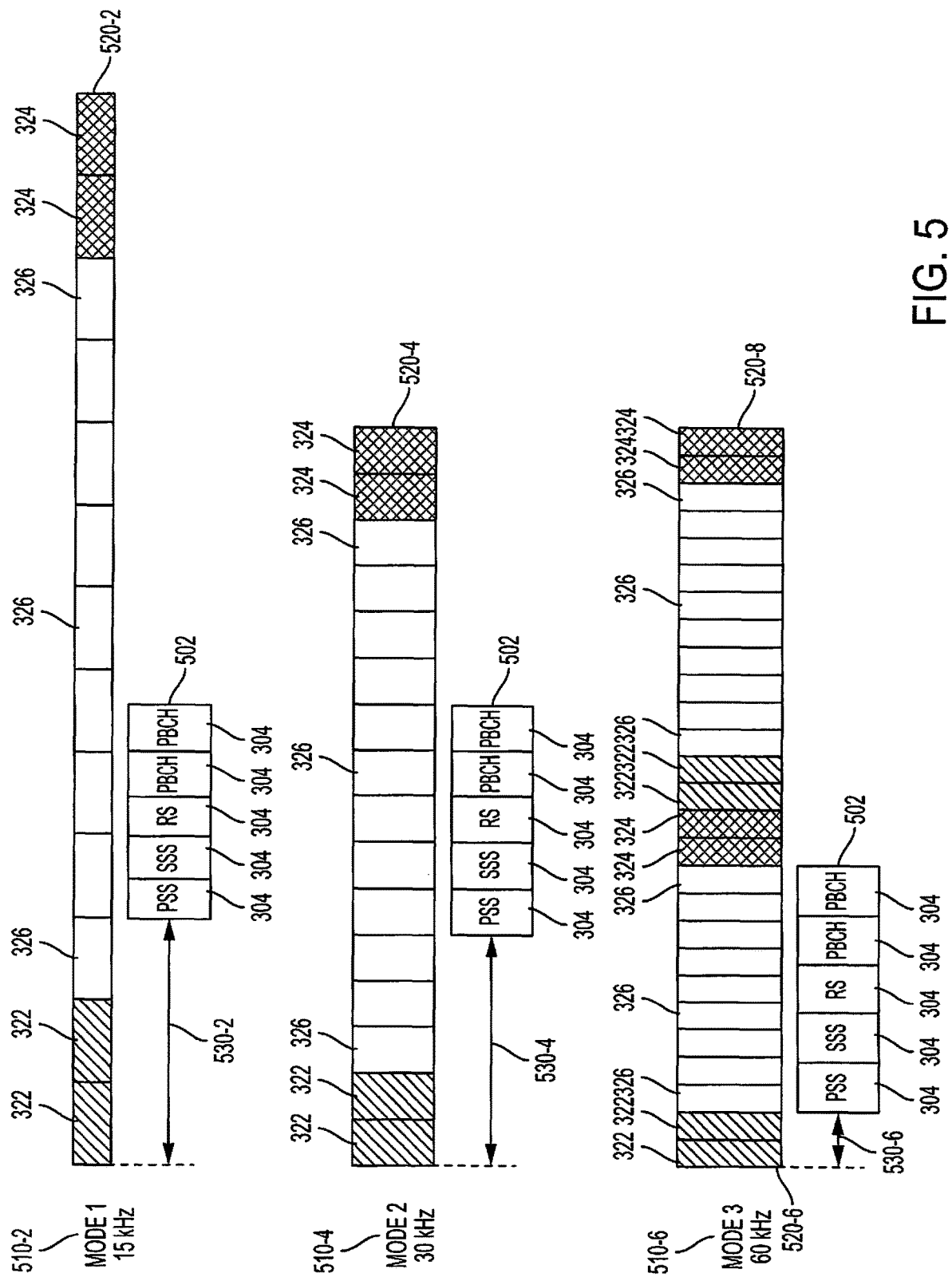
FIG. 5 is a block diagram conceptually illustrating a system for indicating a boundary of a communication block in a unified synchronization channel design according to some embodiments of the present disclosure.

FIG. 5 shows a block diagram for indicating a boundary of a communication block for a unified synchronization channel configuration that may be used in wireless network 100. Boundary indicating configurations of embodiments may be used, for example, for communications between gNB 105 and UE 115, between gNBs 105a-c, or between multiple UEs. FIG. 5 shows a configuration for indicating boundaries of communication blocks (e.g., frames, subframes, or slots) for a unified synchronization signal configuration where the same synchronization signal configuration 502 is used for different communication modes 510-2, 510-4, and 510-6 in a wireless communication network. The synchronization signal configuration may, for example, have a fixed length in time when used in the multiple communication modes, wherein the fixed length is selected for configuring the synchronization signal configuration for multiple communication modes. Embodiments of the synchronization signal configuration may utilize one or more gaps, such as discussed above with reference to FIG. 3 for configuring the synchronization signal configuration for multiple communication modes.

In each communication mode, data communication between two nodes are divided into blocks, e.g., frames (or subframes or slots) 520-2, 520-4, 520-6, and 520-8. Each communication block in may include one or more units for control signals (e.g., control symbols 522, 524) and one or more units for data signals (e.g., data symbols 526) located between control signal units. In some embodiments, control signals in communication blocks 520-2, 520-4, 520-6, and 520-8 may include one or more units (e.g., 522) for downlink (from a gNB to a UE) control signals and/or one or more units (e.g., 524) for uplink (from a UE to a gNB) control signals. In some wireless communication systems, a communication block may represent a frame, two consecutive units in the communication block may represent a subframe (e.g., in a time division duplex (TDD) or frequency division duplex (FDD) system), and one unit in the communication block may represent a slot (e.g., in an FDD system). In some embodiments, a communication block may represent a subframe or a slot.

It should be appreciated that, although the embodiment illustrated in FIG. 5 shows a contiguous configuration of SSB synchronization signals, other configurations of synchronization signals may be utilized with boundary indication implementations of the present disclosure. For example, a split SSB synchronization signal configuration, such as that of the exemplary embodiment illustrated in FIG. 3, may be utilized with communication block boundary indication implementations of the present disclosure.

In the illustrated example, as with the example of FIG. 3 above, each communication mode operates utilizing a different subcarrier spacing, communication mode 510-2 operates utilizing a 15 kHz subcarrier spacing, communication mode 510-4 operates utilizing a 30 kHz subcarrier spacing, and communication mode 510-6 operates utilizing a 60 kHz subcarrier spacing. Consequently, communication blocks 520-2, 520-4, 520-6, and 520-8 for these different communication modes provide different symbol sizes and different offset from the communication block boundaries.

In the illustrated embodiment, synchronization signal configuration 502 may include an arrangement of multiple synchronization signals 504 comprising a SSB, which may include, for example, a PSS, SSS, RS, and signals transmitted over a PBCH, For example, irk the illustrated embodiment, the SSB of synchronization signal configuration 502 comprises a suite of synchronization signals including a PSS followed by a SSS and a RS (e.g., MRS), which is in turn followed by two PBCH signals. It should be noted that although synchronization signal configuration 502 starts with a PSS in the illustrated example, in some other embodiments, the SSB of synchronization signal configuration 502 may start with any other types of synchronization signals, such as an SSS, RS, PBCH, or the like. Further, it should be noted that in some other embodiments, the SSB of synchronization signal configuration 502 may comprise a suite of synchronization signals including any combination of any number of synchronization signals in any suitable order.

In order to fit, the same synchronization signal configuration 502 into data units 526, the SSB of synchronization), signal configuration 502 may be placed in different locations relative to the beginning of communication blocks 520-2, 520-4, 520-6, 520-8 in different communication modes 510-2, 510-4, and 510-6. In some wireless communication systems, synchronization signals are first detected, and then the boundary of a communication Hook the beginning of the communication block) containing the synchronization signals is then determined relative to the position of the synchronization signals. Therefore, a mechanism of embodiments herein that clearly indicates the boundary of a communication block in different communication modes may provide efficient processing and reduce the computational complexity in the system.

A technique for boundary identification according to some embodiments of the disclosure provides information (referred to herein as boundary information) indicating the relative distance between the communication block boundary and the beginning of synchronization signals via at least one of the synchronization signals. In such a configuration, once a receiving node (e.g. UE) receives the communication block and detects the synchronization signals, the receiving node can extract the boundary information from the synchronization signals and then determine the boundary of the communication block.

In operation according to embodiments, distances 530-2, 530-4, 530-6 between the beginning of communication blocks 520-2, 520-4, 520-6 and the beginning of the SSB of synchronization signal configuration 502 may be predetermined for each of the communication modes. The communication mode of a communication block may be indicated in boundary information included in at least one of the synchronization signals of the SSB of synchronization signal configuration 502 (e.g., one or more of PSS, SSS, RS, and PBCH) according to embodiments of the present disclosure. For example, in the illustrated example, distance 530-2 represents that the beginning of communication block 520-2 is three units (e.g., symbols) from the beginning of the beginning of the SSB of synchronization signal configuration 502 for communication mode 510-2, distance 530-4 represents that the beginning of communication block 520-4 is five units (e.g., symbols) from the beginning of the SSB of synchronization signal configuration 502 for communication mode 510-4, and distance 530-6 represents that the beginning of communication block 520-6 is two units (e.g., symbols) from the beginning of the beginning of the SSB of synchronization signal configuration 502 for communication mode 510-6. In accordance with embodiments of the disclosure, the foregoing distances between the beginning of a communication block and the beginning of a SSB (e.g., 3 units for communication mode 510-2, 5 units for communication mode 510-4, and 2 units for communication mode 510-6) are predetermined, and thus may be known a priori by the various nodes of the network (e.g., gNB, UE, etc.). Thus, when a receiver detects a SSB of synchronization signal configuration 502 in a received communication block and determines from the boundary information included in one or more of the synchronization signals that the communication mode in use is communication mode 510-2, then the receiver may determine that the communication block starts three units ahead of the beginning the SSB of synchronization signal configuration 502 (which is the beginning of PSS in the illustrated example). Alternatively, when a receiver detects synchronization signal configuration 502 in a received communication block and determines from the boundary information included in one or more of the synchronization signals that the communication mode in use is communication mode 510-4, then the receiver may determine that the communication block starts five units ahead of the beginning the SSB of synchronization signal configuration 502.

Alternatively, the distances 530-2, 530-4, 530-6 between the beginning of communication blocks 520-2, 520-4, 520-6 and the beginning of a SSB of synchronization signal configuration 502 may not be predetermined for each communication modes, such as in embodiments where flexibility in placing a SSB of synchronization signal configuration 502 at any position in a communication block is supported. The values of distances 530-2, 530-4, 530-6 with respect to the different communication modes may be indicated in boundary information included in at least one of the synchronization signals of a SSB of synchronization signal configuration 502 (e.g., one or more of PBCH, PSS, SSS, and RS). Because the distances 530-2, 530-4, 530-6 are not predetermined for each communication mode, this solution has the advantage of flexibly placing a SSB of synchronization signal configuration 502 at any position in a communication block. For example, in one embodiment, the beginning of a SSB of synchronization signal configuration 502 may be placed six units after the beginning of a communication block, and such relative distance is indicated through boundary information included in one or more of the synchronization signals (e.g., a PBCH signal) of the SSB. Once a receiving node receives the communication block, it can determine the beginning of the communication block by detecting the beginning of the SSB of synchronization signal configuration 502 and extracting the boundary information comprising the aforementioned distance information from the PBCH signal.

In operation according to embodiments, a receiving node may determine the particular communication mode (e.g., communication mode 510-2, communication mode 510-4, or communication mode 510-6) in use with respect to a communication block using SSB numerology (e.g., dependent on carrier frequency). It should be appreciated that, in the above scenario, the communication mode in use does not need to be indicated in one of the synchronization signals. However, embodiments may nevertheless indicate the communication mode of a communication block in boundary information included in at least one of the synchronization signals of synchronization signal configuration 502. For example, the boundary information may be derived for each communication mode via SSB index, where the SSB index may be determined by RS and PBCH contents, for example.

Figure 6:
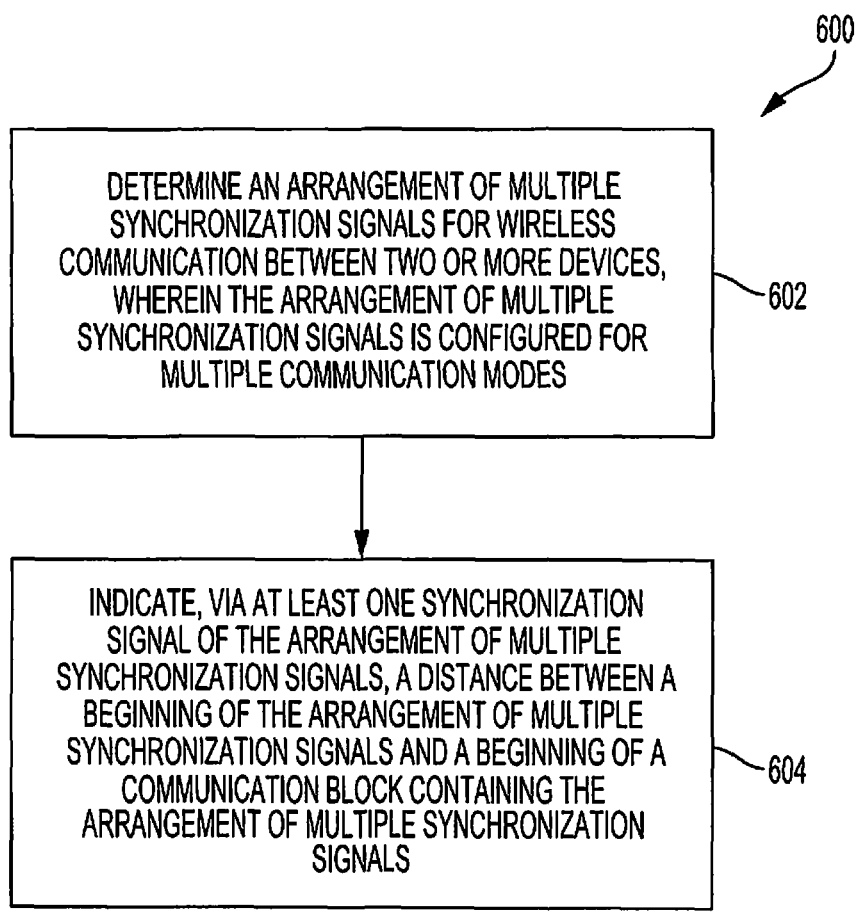
FIG. 6 is a block diagram conceptually illustrating a method for indicating a boundary of a communication block in a unified synchronization channel design according to some embodiments of the present disclosure.

FIG. 6 shows a block diagram for method 600 of indicating a boundary of a communication block that contains a unified synchronization signal arrangement. In the illustrated embodiment, at block 602 unified synchronization signal logic (e.g., an instruction set stored by memory 242 and executable upon controller/processor 240 of gNB 105) of a network node determines an arrangement of multiple synchronization signals for wireless communication between two or more nodes, wherein the arrangement of multiple synchronization signals is configured for multiple communication modes (e.g., includes a particular arrangement of synchronization signals, with or without one or more gaps, and a relative distance between the beginning of communication blocks of each of a plurality of communication modes and the beginning of the synchronization signal arrangement to accommodate the synchronization signal arrangement in the communication blocks of each of the plurality of communication modes). Each communication mode of the multiple communication modes may, for example, operate using different subcarrier spacing. The nodes may include a gNB, a UE, and/or other devices in wireless communication network 100 as described above in connection with FIG. 1. The unified synchronization signal arrangement may include synchronization signal configurations 302, 502 providing SSBs as described above in FIGS. 3 and 5 or any other configurations appropriate for use with respect to the multiple communication modes being accommodated. The synchronization signals in SSBs of the synchronization signal arrangement may include one or more of the following signals: PSS, SSS, RS, and/or PBCH signals.

In operation according to embodiments, at block 604 unified synchronization signal logic causes a relative distance between a beginning of the arrangement of multiple synchronization signals and a beginning of a communication block containing the arrangement of multiple synchronization signals to be indicated via at least one synchronization signal of the arrangement of multiple synchronization signals. For example, an instruction set stored by memory 242 and executable upon controller/processor 240 of gNB 105 may control transmit processor 220 in insert boundary information indicating the relative distance into one or more synchronization signals (e.g., PSS, SSS, RS, and/or PBCH signals) of the synchronization signal arrangement. In operation according to an exemplary embodiment, RS and PBCH together with SSB numerology may be utilized to carry boundary information, such as to enable boundary information for each communication mode to be derived via SSB index where SSB index is determined by RS and PBCH contents.

In some embodiments, the relative distances (e.g., distances 530-2, 530-4, 530-6 described in FIG. 5 or similar distances as present in the configuration of FIG. 3) may be predetermined for each communication mode (e.g., communication modes 520-2, 510-4, 510-6 described above in connection with FIG. 5 or similar communication modes as present in the configuration of FIG. 3). Accordingly, the boundary information inserted into one or more synchronization signals may indicate the communication mode in use, whereby the receiving node may derive the relative distance from the communication mode information and knowledge of the corresponding predetermined relative distance. For example, unified synchronization signal logic (e.g., an instruction set stored by memory 242 and executable upon controller/processor 240 of gNB 105) may determine the communication mode being used with respect to a communication (e.g., one of communication modes 510-2, 510-4, or 510-6 or similar communication modes as present in the configuration of FIG. 3) and control a transmit signal processor (e.g., transmit processor 220 of gNB 105) to insert boundary information indicating that particular communication mode into one or more synchronization signals of the synchronization signal arrangement. In operation according to an exemplary embodiment, the contents of RS and PBCH may be provided with information from which the SSB index may be determined by a receiving node, whereby the SSB index and SSB numerology indicate the communication mode in use. Correspondingly, the unified synchronization signal logic may control the transmit signal processor to include the synchronization signal arrangement within a communication block (e.g., a frame) with the appropriate relative distance between a beginning of the synchronization signal arrangement and a beginning of the communication block. For example, the unified synchronization signal logic may access one or more databases (e.g., a communication mode unified synchronization signal relative distance look up table stored by memory 242 of gNB 105 providing a knowledge base regarding the relative distance from the beginning of the synchronization signal arrangement and a beginning of a communication block containing the synchronization signal arrangement for each of the plurality of communication modes accommodated) to determine an appropriate relative distance (e.g., distances 530-2, 530-4, 530-6 described in FIG. 5 or similar distances as present in the configuration of FIG. 3) for the synchronization signal arrangement for the communication mode being used, and then provide appropriate control to implement the relative distance when disposing the synchronization signals of the synchronization signal arrangement in the communication block.

In some embodiments, the relative distance (e.g., distances 530-2, 530-4, 530-6 described in FIG. 5 or similar distances as present in the configuration of FIG. 3) is not predetermined. Accordingly, the boundary information inserted into one or more synchronization signals may indicate the value of the relative distance. For example, unified synchronization signal logic (e.g., an instruction set stored by memory 242 and executable upon controller/processor 240 of gNB 105) may determine the communication mode being used with respect to a communication (e.g., one of communication modes 510-2, 510-4, or 510-6 or similar communication modes as present in the configuration of FIG. 3) and derive the corresponding relative distance (e.g., distances 530-2, 530-4, 530-6 described in FIG. 5 or similar distances as present in the configuration of FIG. 3) value for that particular communication mode from the synchronization signal arrangement determined at block 602. Thereafter, the unified synchronization signal logic may control a transmit signal processor (e.g., transmit processor 220 of gNB 105) to insert boundary information indicating that particular relative distance into one or more synchronization signals of the synchronization signal arrangement. In operation according to an exemplary embodiment, RS and PBCH may be utilized to carry boundary information such as that indicating the relative distance. Correspondingly, the unified synchronization signal logic may control the transmit signal processor to include the synchronization signal arrangement within a communication block (e.g., a frame) with the appropriate relative distance between a beginning of the synchronization signal arrangement and a beginning of the communication block, as previously determined.

Figure 7:
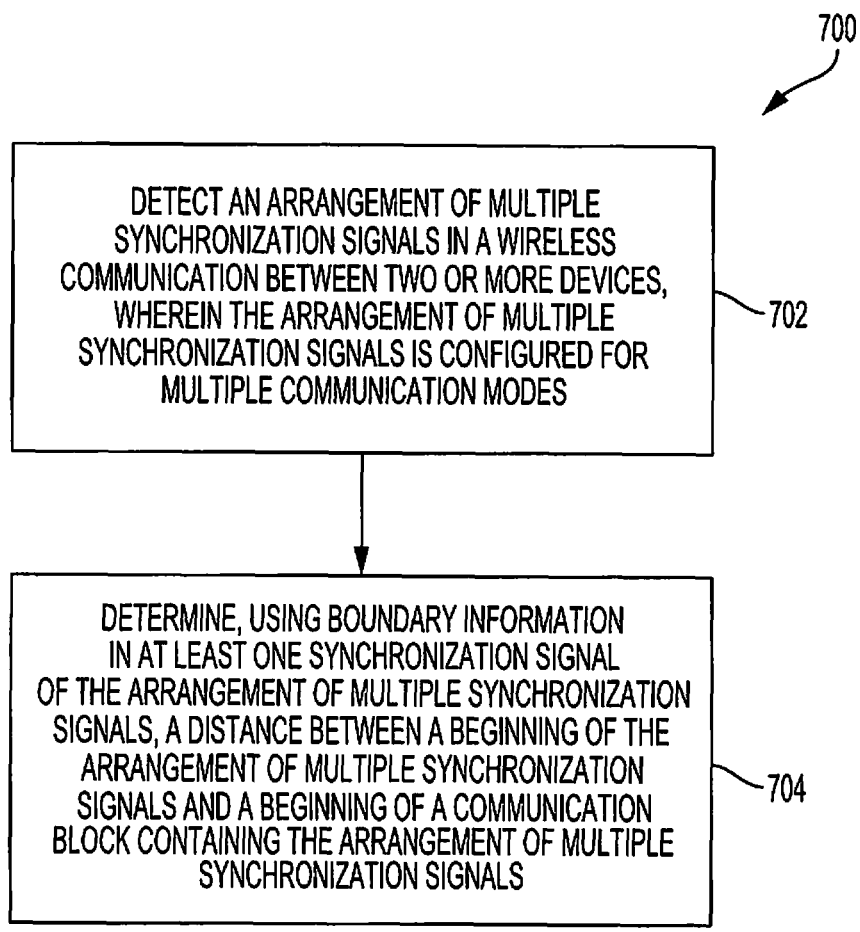
FIG. 7 is a block diagram conceptually illustrating a method for determining a boundary of a communication block in a unified synchronization channel design according to some embodiments of the present disclosure.

FIG. 7 shows a block diagram for method 700 of determining a boundary of a communication block that contains a unified synchronization signal arrangement. In the illustrated embodiment, at block 702 unified synchronization signal logic (e.g., an instruction set stored by memory 282 and executable upon controller/processor 280 of UE 115) of a network node monitors one or more channels for synchronization signals (e.g., PSS, SSS, RS, and/or PBCH signals) of an arrangement of multiple synchronization signals to detect the presence of the synchronization signal arrangement in a transmission. For example, a receive processor (e.g., receive processor 258) may process and analyze received signals to detect one or more synchronization signals, whereby the receive processor provides information regarding the detected synchronization signals to a controller (e.g., controller/processor 280) of the receiving node for determining if a particular arrangement of multiple synchronization signals is present in the received signals (e.g., a synchronization signal arrangement is carried in a received communication block).

In operation according to embodiments, at block 704, where the synchronization signal arrangement is determined to be present in the received signals, unified synchronization signal logic determines a relative distance between a beginning of the arrangement of multiple synchronization signals and a beginning of a communication block containing the arrangement of multiple synchronization signals to be indicated via at least one synchronization signal of the arrangement of multiple synchronization signals. For example, an instruction set stored by memory 282 and executable upon controller/processor 280 of UE 115 may control receive processor 258 to extract boundary information indicating the relative distance from one or more synchronization signals (e.g., PSS, SSS, RS, and/or PBCH signals) of the synchronization signal arrangement and provide the boundary information to controller/processor 280. The unified synchronization signal logic may utilize the boundary information extracted from the one or more synchronization signals to determine the relative distance between the beginning of the detected synchronization signal arrangement and the beginning of a communication block in which the synchronization signal arrangement was received.

In some embodiments, the relative distances (e.g., distances 530-2, 530-4, 530-6 described in FIG. 5 or similar distances as present in the configuration of FIG. 3) may be predetermined for each communication mode (e.g., communication modes 520-2, 510-4, 510-6 described above in connection with FIG. 5 or similar communication modes as present in the configuration of FIG. 3). Accordingly, the boundary information extracted from one or more synchronization signals may indicate the communication mode in use, whereby the receiving node may derive the relative distance from the communication mode information and knowledge of the corresponding predetermined relative distance. For example, unified synchronization signal logic (e.g., an instruction set stored by memory 282 and executable upon controller/processor 280 of UE 115) may analyze the extracted boundary information to determine the communication mode being used with respect to a received communication block (e.g., one of communication modes 510-2, 510-4, or 510-6 or similar communication modes as present in the configuration of FIG. 3) and access one or more databases (e.g., a communication mode unified synchronization signal relative distance look up table stored by memory 282 of UE 115 providing a knowledge base regarding the relative distance from the beginning of the synchronization signal arrangement and a beginning of a communication block containing the synchronization signal arrangement for each of the plurality of communication modes accommodated) to determine the relative distance (e.g., distances 530-2, 530-4, 530-6 described in FIG. 5 or similar distances as present in the configuration of FIG. 3) from the beginning of the detected synchronization signal arrangement and the beginning of the communication block for the communication mode being used. Thereafter, the unified synchronization signal logic may provide appropriate control to utilize the relative distance information for detecting the beginning of the communication block, such as for extracting data therefrom.

In some embodiments, the relative distance (e.g., distances 530-2, 530-4, 530-6 described in FIG. 5 or similar distances as present in the configuration of FIG. 3) is not predetermined. Accordingly, the boundary information extracted from one or more synchronization signals may indicate the value of the relative distance. Unified synchronization signal logic (e.g., an instruction set stored by memory 282 and executable upon controller/processor 280 of UE 115) of embodiments may thus obtain the relative distance between the beginning of the synchronization signal arrangement and the beginning of the communication block directly from the boundary information extracted from one or more synchronization signals by the receive processor (e.g., receive processor 258). Thereafter, the unified synchronization signal logic may provide appropriate control to utilize the relative distance information for detecting the beginning of the communication block, such as for extracting data therefrom.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining an arrangement of multiple synchronization signals for wireless communication between two or more nodes, wherein the arrangement of multiple synchronization signals is configured for multiple communication modes, and
   indicating, via at least one synchronization signal of the arrangement of multiple synchronization signals, a distance between a beginning of the arrangement of multiple synchronization signals and a beginning of a communication block containing the arrangement of multiple synchronization signals.

2. The method of claim 1, wherein the distance is predetermined for each communication mode of the multiple communication modes and the at least one synchronization signal of the arrangement of multiple synchronization signals indicates a communication mode of the multiple communication modes in use.

3. The method of claim 2, wherein the at least one synchronization signal comprises a synchronization signal selected from the group consisting of a primary synchronization signal (PSS) that indicates a communication mode in use, a secondary synchronization signal (SSS) that indicates a communication mode in use, a reference signal (RS) that indicates a communication mode in use, and a signal communicated over a physical broadcast channel (PBCH) that indicates a communication mode in use.

4. The method of claim 1, wherein the at least one synchronization signal of the multiple communication signals directly indicates the distance between a beginning of the arrangement of multiple synchronization signals and a beginning of a communication block containing the arrangement of multiple synchronization signals.

5. The method of claim 4, wherein the at least one synchronization signal of the multiple communication signals directly indicating the distance between a beginning of the arrangement of multiple synchronization signals and a beginning of a communication block containing the arrangement of multiple synchronization signals includes a signal communicated over a physical broadcast channel (PBCH) that indicates the distance.

6. The method of claim 1, wherein the distance between a beginning of the arrangement of multiple synchronization signals and a beginning of a communication block containing the arrangement of multiple synchronization signals is indicated by contents of one or more synchronization signals of the at least one synchronization signal of the multiple communication signals.

7. The method of claim 6, wherein the one or more synchronization signals indicating the distance between a beginning of the arrangement of multiple synchronization signals and a beginning of a communication block containing the arrangement of multiple synchronization signals comprise a reference signal (RS) and a physical broadcast channel (PBCH) of the at least one synchronization signal of the multiple communication signals.

8. The method of claim 1, wherein the arrangement of multiple synchronization signals has a fixed length in time when used in the multiple communication modes, wherein the fixed length is selected for configuring the arrangement of multiple synchronization signals for the multiple communication modes.

9. The method of claim 1, wherein the arrangement of multiple synchronization signals has at least one gap between synchronization signals of the arrangement of synchronization signals, wherein the gap is selected for configuring the arrangement of multiple synchronization signals for the multiple communication modes.

10. The method of claim 9, further comprising:
    determining the at least one gap between synchronization signals of the arrangement of multiple synchronization signals to configure the arrangement of multiple synchronization signals for transmission by any communication mode of the multiple communication modes, wherein each communication mode of the multiple communication modes implements a different numerology.

11. An apparatus configured for wireless communication, comprising:
    at least one processor; and
    a memory coupled to the at least one processor, wherein the at least one processor is configured:
      to determine an arrangement of multiple synchronization signals for wireless communication between two or more nodes, wherein the arrangement of multiple synchronization signals is configured for multiple communication modes, and
      to indicate, via at least one synchronization signal of the arrangement of multiple synchronization signals, a distance between a beginning of the arrangement of multiple synchronization signals and a beginning of a communication block containing the arrangement of multiple synchronization signals.

12. The apparatus of claim 11, wherein the distance is predetermined for each communication mode of the multiple communication modes and the at least one synchronization signal of the arrangement of multiple synchronization signals indicates a communication mode of the multiple communication modes in use.

13. The apparatus of claim 12, wherein the at least one synchronization signal comprises a synchronization signal selected from the group consisting of a primary synchronization signal (PSS) that indicates a communication mode in use, a secondary synchronization signal (SSS) that indicates a communication mode in use, a reference signal (RS) that indicates a communication mode in use, and a signal communicated over a physical broadcast channel (PBCH) that indicates a communication mode in use.

14. The apparatus of claim 11, wherein the at least one synchronization signal of the multiple communication signals directly indicates the distance between a beginning of the arrangement of multiple synchronization signals and a beginning of a communication block containing the arrangement of multiple synchronization signals.

15. The apparatus of claim 14, wherein the at least one synchronization signal of the multiple communication signals directly indicating the distance between a beginning of the arrangement of multiple synchronization signals and a beginning of a communication block containing the arrangement of multiple synchronization signals includes a signal communicated over a physical broadcast channel (PBCH) that indicates the distance.

16. The apparatus of claim 11, wherein the distance between a beginning of the arrangement of multiple synchronization signals and a beginning of a communication block containing the arrangement of multiple synchronization signals is indicated by contents of one or more synchronization signals of the at least one synchronization signal of the multiple communication signals.

17. The apparatus of claim 16, wherein the one or more synchronization signals indicating the distance between a beginning of the arrangement of multiple synchronization signals and a beginning of a communication block containing the arrangement of multiple synchronization signals comprise a reference signal (RS) and a physical broadcast channel (PBCH) of the at least one synchronization signal of the multiple communication signals.

18. The apparatus of claim 11, wherein the arrangement of multiple synchronization signals has a fixed length in time when used in the multiple communication modes, wherein the fixed length is selected for configuring the arrangement of multiple synchronization signals for the multiple communication modes.

19. The apparatus of claim 11, wherein the arrangement of multiple synchronization signals has at least one gap between synchronization signals of the arrangement of synchronization signals, wherein the gap is selected for configuring the arrangement of multiple synchronization signals for the multiple communication modes.

20. A method of wireless communication, comprising:
  detecting an arrangement of multiple synchronization signals in a wireless communication between two or more nodes, wherein the arrangement of multiple synchronization signals is configured for multiple communication modes, and
  determining, using boundary information carried by at least one synchronization signal of the arrangement of multiple synchronization signals, a distance between a beginning of the arrangement of multiple synchronization signals and a beginning of a communication block containing the arrangement of multiple synchronization signals.

21. The method of claim 20, wherein the distance is predetermined for each communication mode of the multiple communication modes and the at least one synchronization signal of the arrangement of multiple synchronization signals indicates a communication mode of the multiple communication modes in use.

22. The method of claim 21, wherein the at least one synchronization signal comprises a synchronization signal selected from the group consisting of a primary synchronization signal (PSS) that indicates a communication mode in use, a secondary synchronization signal (SSS) that indicates a communication mode in use, a reference signal (RS) that indicates a communication mode in use, and a signal communicated over a physical broadcast channel (PBCH) that indicates a communication mode in use.

23. The method of claim 20, wherein the at least one synchronization signal of the multiple communication signals directly indicates the distance between a beginning of the arrangement of multiple synchronization signals and a beginning of a communication block containing the arrangement of multiple synchronization signals.

24. The method of claim 20, wherein the distance between a beginning of the arrangement of multiple synchronization signals and a beginning of a communication block containing the arrangement of multiple synchronization signals is derived from contents of one or more synchronization signals of the at least one synchronization signal of the multiple communication signals.

25. The method of claim 24, wherein the one or more synchronization signals from which the distance between a beginning of the arrangement of multiple synchronization signals and a beginning of a communication block containing the arrangement of multiple synchronization signals is derived comprise a reference signal (RS) and a physical broadcast channel (PBCH) of the at least one synchronization signal of the multiple communication signals.

26. The method of claim 20, wherein the arrangement of multiple synchronization signals has at least one gap between synchronization signals of the arrangement of synchronization signals, wherein the gap is selected for configuring the arrangement of multiple synchronization signals for the multiple communication modes.

27. An apparatus configured for wireless communication, comprising:
  at least one processor; and
  a memory coupled to the at least one processor, wherein the at least one processor is configured:
    to detect an arrangement of multiple synchronization signals in a wireless communication between two or more nodes, wherein the arrangement of multiple synchronization signals is configured for multiple communication modes, and
    to determine, using boundary information carried by at least one synchronization signal of the arrangement of multiple synchronization signals, a distance between a beginning of the arrangement of multiple synchronization signals and a beginning of a communication block containing the arrangement of multiple synchronization signals.

28. The apparatus of claim 27, wherein the distance is predetermined for each communication mode of the multiple communication modes and the at least one synchronization signal of the arrangement of multiple synchronization signals indicates a communication mode of the multiple communication modes in use.

29. The apparatus of claim 28, wherein the at least one synchronization signal comprises a synchronization signal selected from the group consisting of a primary synchronization signal (PSS) that indicates a communication mode in use, a secondary synchronization signal (SSS) that indicates a communication mode in use, a reference signal (RS) that indicates a communication mode in use, and a signal communicated over a physical broadcast channel (PBCH) that indicates a communication mode in use.

30. The apparatus of claim 27, wherein the at least one synchronization signal of the multiple communication signals directly indicates the distance between a beginning of the arrangement of multiple synchronization signals and a beginning of a communication block containing the arrangement of multiple synchronization signals.

31. The apparatus of claim 27, wherein the distance between a beginning of the arrangement of multiple synchronization signals and a beginning of a communication block containing the arrangement of multiple synchronization signals is derived from contents of one or more synchronization signals of the at least one synchronization signal of the multiple communication signals.

32. The apparatus of claim 31, wherein the one or more synchronization signals from which the distance between a beginning of the arrangement of multiple synchronization signals and a beginning of a communication block containing the arrangement of multiple synchronization signals is derived comprise a reference signal (RS) and a physical broadcast channel (PBCH) of the at least one synchronization signal of the multiple communication signals.

33. The apparatus of claim 27, wherein the arrangement of multiple synchronization signals has at least one gap between synchronization signals of the arrangement of synchronization signals, wherein the gap is selected for configuring the arrangement of multiple synchronization signals for the multiple communication modes.

34. A method of wireless communication, comprising:
determining an arrangement of multiple synchronization signals for wireless communication between two or more nodes;
determining at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology; and
indicating, via at least one synchronization signal of the arrangement of multiple synchronization signals, a distance between a beginning of the arrangement of multiple synchronization signals and a beginning of a communication block containing the arrangement of multiple synchronization signals.

35. The method of claim 34, wherein the different numerology comprises different subcarrier spacing.

36. The method of claim 35, wherein the different subcarrier spacing of the plurality of communication modes comprises 15 kHz, 30 kHz, and 60 kHz.

37. The method of claim 34, wherein the at least one gap configures the synchronization signals of the arrangement of synchronization signals to avoid an overlap of any of the multiple synchronization signals with another control signal for the wireless communication.

38. The method of claim 34, wherein the arrangement of multiple synchronization signals has a fixed length in time when used in the multiple wireless communication modes.

39. An apparatus configured for wireless communication, comprising:
at least one processor; and
a memory coupled to the at least one processor, wherein the at least one processor is configured:
to determine an arrangement of multiple synchronization signals for wireless communication between two or more nodes;
to determine at least one gap between synchronization signals of the arrangement of multiple synchronization signals to configure the arrangement of multiple synchronization signals for transmission by any communication mode of a plurality of communication modes, wherein each communication mode of the plurality of communication modes implements a different numerology; and
to indicate, via at least one synchronization signal of the arrangement of multiple synchronization signals, a distance between a beginning of the arrangement of multiple synchronization signals and a beginning of a communication block containing the arrangement of multiple synchronization signals.

40. The apparatus of claim 39, wherein the different numerology comprises different subcarrier spacing.

41. The apparatus of claim 40, wherein the different subcarrier spacing of the plurality of communication modes comprises 15 kHz, 30 kHz, and 60 kHz.

42. The apparatus of claim 39, wherein the at least one gap configures the synchronization signals of the arrangement of synchronization signals to avoid an overlap of any of the multiple synchronization signals with another control signal for the wireless communication.

43. The apparatus of claim 39, wherein the arrangement of multiple synchronization signals has a fixed length in time when used in the multiple wireless communication modes.

* * * * *